US011288760B2

(12) United States Patent
Hanchett et al.

(10) Patent No.: US 11,288,760 B2
(45) Date of Patent: Mar. 29, 2022

(54) SYSTEMS AND METHODS FOR RECOVERING INFORMATION FROM A RECORDING DEVICE

(71) Applicant: Axon Enterprise, Inc., Scottsdale, AZ (US)

(72) Inventors: Mark A. Hanchett, Mesa, AZ (US); Patrick W. Smith, Scottsdale, AZ (US); Tyler J. Conant, Seattle, WA (US); Aaron J. Kloc, Scottsdale, AZ (US)

(73) Assignee: Axon Enterprise, Inc., Scottsdale, AZ (US)

( * ) Notice: Subject to any disclaimer, the term of this patent is extended or adjusted under 35 U.S.C. 154(b) by 261 days.

(21) Appl. No.: 15/677,986

(22) Filed: Aug. 15, 2017

(65) Prior Publication Data

US 2018/0075562 A1  Mar. 15, 2018

Related U.S. Application Data

(60) Provisional application No. 62/395,270, filed on Sep. 15, 2016.

(51) Int. Cl.
*G06Q 50/26* (2012.01)
*H04L 9/32* (2006.01)
(Continued)

(52) U.S. Cl.
CPC .......... *G06Q 50/265* (2013.01); *H04L 9/3247* (2013.01); *H04N 21/2353* (2013.01);
(Continued)

(58) Field of Classification Search
CPC ..... G06Q 50/265; H04L 9/3247; H04L 67/10; H04N 21/2353; H04N 21/432; H04N 21/4334
See application file for complete search history.

(56) References Cited

U.S. PATENT DOCUMENTS

2003/0126432 A1\* 7/2003 Tonisson ................ H04L 9/321
713/156
2009/0141129 A1  6/2009 Dischinger
(Continued)

FOREIGN PATENT DOCUMENTS

KR  10-1113844 B1  2/2012

OTHER PUBLICATIONS

International Searching Authority, International Search Report and Written Opinion for PCT Application No. PCT/US2017/047025 dated Nov. 28, 2017.

*Primary Examiner* — John W Hayes
*Assistant Examiner* — Ari Shahabi
(74) *Attorney, Agent, or Firm* — Justin Powley

(57) ABSTRACT

A recording device may record information continuously. Particular events which occur during recording may be of interest for review (e.g. audit, inspection). Events may be audited to ensure that the data gathered is not tampered with or corrupted and to provably establish an evidence chain of custody. Metadata may mark recorded data of an event, in whole or in part, for later review. Metadata may be identified as an audit tag which may identify particular occurrences during an event. An audit tag may be urgent or non-urgent. Notice of an urgent audit tag may be sent to a server prior to sending the recorded data associated with the audit tag. Recorded data may be cryptographically signed to protect the recorded data from tampering.

20 Claims, 10 Drawing Sheets

(51) Int. Cl.
  *H04N 21/235* (2011.01)
  *H04N 21/432* (2011.01)
  *H04N 21/433* (2011.01)
  *H04L 67/10* (2022.01)

(52) U.S. Cl.
  CPC ....... *H04N 21/432* (2013.01); *H04N 21/4334* (2013.01); *H04L 67/10* (2013.01)

(56) References Cited

U.S. PATENT DOCUMENTS

| | | |
|---|---|---|
| 2013/0208124 A1 | 8/2013 | Boghossian |
| 2015/0341497 A1* | 11/2015 | Gray ................... H04M 3/5335 455/413 |
| 2016/0027466 A1 | 1/2016 | Smith et al. |
| 2016/0246996 A1* | 8/2016 | Khoo ................... G11B 27/031 |
| 2016/0286156 A1* | 9/2016 | Kovac ................... F41C 33/029 |

* cited by examiner

SYSTEMS AND METHODS FOR RECOVERING INFORMATION FROM A RECORDING DEVICE

FIELD OF INVENTION

Embodiments of the present invention relate to recording devices.

BRIEF DESCRIPTION OF THE SEVERAL VIEWS OF THE DRAWING

Embodiments of the present invention will be described with reference to the drawing, wherein like designations denote like elements, and.

DETAILED DESCRIPTION

Figure 1:
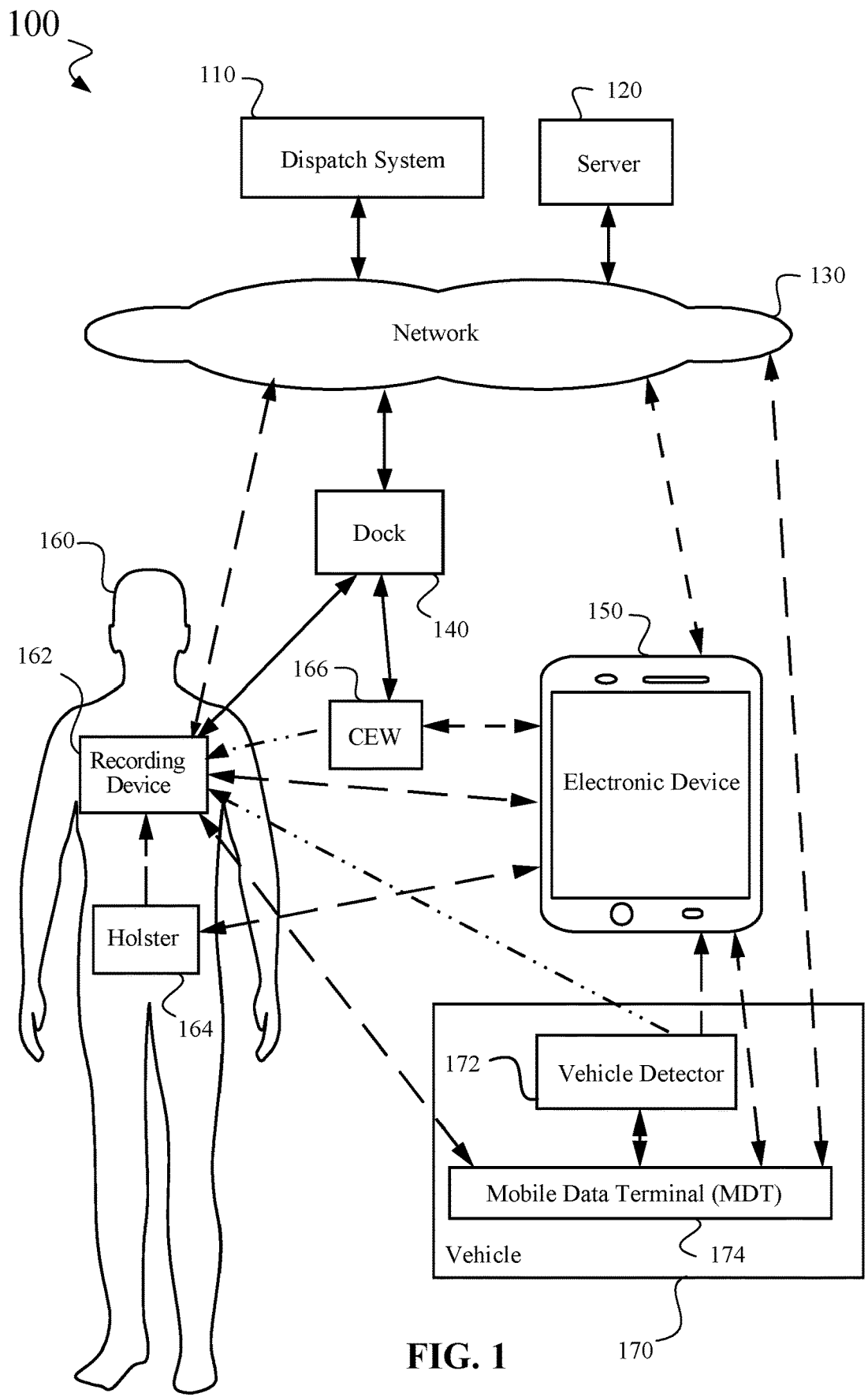
FIG. 1 is a block diagram of an implementation of a system for auditing recording device activity.

A security agency provides security to and possibly administers the laws of a jurisdiction. A security agency may include personnel (e.g., officers, administrators, commanders). Agency personnel may respond to events. An event may include a series of happenings (e.g., occurrences, activities, developments). For example, agency personnel may respond to events such as a crime in progress, a traffic stop, a vehicle accident, and an investigation into possible wrong-doing.

A security agency may issue equipment for performing the functions of the security agency. Equipment that may be issued to officers include a vehicle, a gun, a holster for a firearm, a conducted electrical weapon ("CEW"), one or more recording devices (e.g., body-worn cameras, vehicle cameras, infrared cameras, wireless microphones, radar guns, breathalyzers) to capture and store physical data related to the event, a radio, a vehicular computer, a smartphone, a cell phone, and other devices for communicating, transporting, recording (e.g., capturing and storing) data, and providing a force.

An event may include the actions taken by an officer during an event. Actions taken by an officer may be considered an occurrence of an event. Actions that may be taken by an officer include, calling for backup, operating a vehicle, providing an assessment of a situation to command, operating (e.g., starting, stopping, pausing) a recording device to record the occurrence of the event, drawing a weapon from a holster, switching on a siren, activating lights, and operating a conducted electrical weapon ("CEW") to provide a current through a target to impede locomotion of the target.

A recording device may capture (e.g., gather, detect) information (e.g., physical properties, data, audio, visual, speed, movement) regarding an event. A recording device may store (e.g., record, remember, save) captured information.

A recording device may also capture, store, and/or produce (e.g., generate, form) metadata. Metadata is data that describes (e.g., is about, documents) the recorded data. A recording device may receive metadata from another device. A recording device may store metadata with or separate from recorded data about the event. A recording device may store metadata so that it is associated with (e.g., relates to, identifies) the recorded data for one or more events, an occurrence that occurred while recording an event, an occurrence that occurred prior to recording an event, a specific location of an occurrence in recorded data, and/or a portion (e.g., middle, start, end) of recorded data for an event.

For example, metadata may include the identity of an operator of the recording device, date of recording data, event type, information received from dispatch, identity of nearby recording devices, data describing the event, and/or data categorizing the event.

Recorded data and/or metadata may be stored in a data store of the recording device. A recording device may retain recorded data and/or metadata until requested by a server or provided to a server for storage and/or management. Recorded data and/or metadata may be protected from tampering, loss, and/or corruption while stored on a recording device to enhance the value of the recorded data as evidence of an event. Cryptographic techniques may be used to protect recorded data and/or metadata stored on a recording device. For example, recorded data and metadata may be digitally signed and stored on a recording device until it can be uploaded to a server. Recorded data and/or metadata may be cryptographically protected as it is being recorded or shortly thereafter to decrease the opportunity for loss, corruption, and/or tampering.

Metadata may be used to audit (e.g., inspect, verify, examine) recorded data. Recorded data of an entire event or portions of the recorded data an event may be audited to identify occurrences during an event of interest. The descriptions of the recorded data as found in metadata may be used to identify recorded data or portions (e.g., locations in the recorded data) where occurrences of interest may have occurred. Occurrences that are not marked and/or described by metadata may be of less interest. Metadata may identify recorded data, in whole or part, for review by an investigator or an algorithm that performs analysis.

Metadata that identifies (e.g., marks, indicates, points to) recorded data for review may be referred to as an audit tag. An audit tag may identify the recorded data of a particular event or a particular place (e.g., location) in the recorded data for review. An audit tag may identify particular occurrences during an event (e.g., firearm drawn, CEW activated, activation of a recording device) for review. An audit tag may identify any location and/or any portion in recorded data for review.

For example, a body camera may be used to record a security officer responding to a report of a domestic dispute. Metadata may be used to store information (e.g., data) regarding receiving the instructions from dispatch to investigate, the type of event, and the location of the event. As the security officer continues to investigate, metadata may record when the officer arrived at the residence and exited the vehicle. As the investigation goes sideways, metadata recorded by the recording device may identify when the security officer drew his CEW, armed his CEW, and then activated his CEW to deliver a force. As the incident progresses, metadata recorded by the camera may record when the security office drew his weapon and/or when the security officer fired the weapon.

The metadata associated with the occurrences of interest (e.g., arm CEW, activate CEW, draw firearm, operate firearm) may be recorded as or include data to identify that metadata as an audit tag. The metadata associated with occurrences of less interest (e.g., type of event, location of event) need not be identified as an audit tag.

The operation of a recording device or other equipment used by a security officer may generate metadata that is identified (e.g., marked) as an audit tag. For example, metadata may identify the functions performed by a recording device as it records. Metadata may record when the recording device starts recording (e.g., responsive to button press by officer, responsive to signal from other equipment), establishing communication (e.g., pairing) with another device, receiving a transmission (e.g., message) from another device, transmitting a message to another device, performance of the recording device (e.g., sensitivity, frame rate, decibels detected), and/or detecting a fault (e.g., low battery, memory error, failure of diagnostics) of the recording device. Metadata related to recording devices and other equipment may be identified as an audit tag for review or not.

Messages received by a recording device that may result in the creation and storage of metadata, which may or may not be identified as an audit tag, include a message from a server (e.g., evidence management system), a dispatch system, a holster, a CEW, a vehicle system, or any other electronic device.

For example, a recording device may receive a message from dispatch as to the type of event to which the person carrying a recording device is being dispatched. Responsive to the message, the recording device generates metadata then stores the event type and its association with the data being recorded. Whether or not the metadata is identified as an audit tag may depend on the type of event. For example, homicides and traffic accidents with fatalities may be identified as audit tag, while a wellness check or routine traffic stop may not be so identified. An audit tag generated responsive to an event type may mark the entire event of being of interest. An event type that results in not creating an audit tag may later create audit tags when an officer draws a weapon or activates a CEW.

Metadata identified as an audit tag may be further categorized as urgent or non-urgent. An audit tag identified as urgent may include those types of occurrences during an event that may indicate a grave situation (e.g., weapon draw, CEW activation, dispatch to a homicide). For example, an audit tag created in response to the recording device receiving a signal that a weapon has been withdrawn from a holster may indicate that lethal force may be used and therefore the situation is urgent. An audit tag created in response to being assigned to report to a homicide or a riot may be identified as urgent. An audit tag identified as non-urgent may include the occurrence of a minor fault in the recording device (e.g., unidentified user name, minor diagnostic fault) or a less important occurrence related to an officer's vehicle (e.g., door open, lights turned off, siren turned off).

Generally, recorded data and metadata, including audit tags, are transferred to a server at the end of a security officer's shift via a dock. A dock is a device used to transfer data and/or to recharge the battery of the recording device. The data transfer link between the recording device and the dock may be wired or wireless. A server receives (e.g., recovers) and stores the recorded data and the metadata. A server may use the metadata identified as audit tags to verify that the portions of the recorded data that was marked as being of interest, was provided by (e.g., sent by) the recording device to the server. The metadata identified as audit tags may also identify recorded data or portions of recorded data that should be reviewed (e.g., audited).

Sending metadata identified as an urgent audit tag to a server independent of and before the recorded data is sent to the server may be used to notify a security agency that a grave happening is in process of occurring. Notice of an urgent audit tag while the event is in progress permits a server to request the recorded data from the recording device in advance of the expected download at the end of the shift. Further, sending metadata identified as an urgent audit tag to a server as it is created or shortly thereafter and independent of sending the recorded data permits the server to track the recording of urgent events and to make a list to ensure that the recorded data associated with urgent events is not lost, spoiled, or destroy. Providing an urgent audit tag to a server shortly after it is created, but prior to data upload provides the server with an inventory list of recorded data whose upload should be expected and verified.

For example, sending audit tags for urgent events or occurrences to a server may be accomplished via a wireless connection shortly after generation of the audit tag. The wireless connection to the server may be made by the recording device and/or via an intermediary electronic device such as a smartphone, tablet, and/or vehicular computer. The server may receive urgent audit tags and make a record to confirm receipt of the recorded data associated with the audit tags at a later date, generally via dock upload. In response to receiving some urgent audit tags, a server may notify people such as supervisors, agency officers, and/or dispatch that an urgent event is in progress. Additionally, a server may request that one or more recording devices send their recorded data to the server via wireless link so that the event may be tracked in real-time or near real-time.

After a recording device has provided event data and metadata for a particular event to a server, the recording device may delete the event data and metadata from its internal memory. A server and a recording device may cooperate to ensure that no data is lost by deletion.

In an implementation, dispatch system 110, server 120, network 130, dock 140, electronic device 150, user 160, and vehicle 170 may cooperate to form auditing system 100.

System 100 may be configured to allow for collection of recorded data and metadata from one or more recording devices. Recorded data and metadata, as described above, may be generated and/or recorded by recording devices during operation and may be gathered by (e.g., sent to) server 120.

User 160 may carry one or more recording devices and/or other equipment. In an implementation, user 160 may carry recording device 162, holster 164, and/or CEW 166. Other recording devices, such as a dashboard camera or a heart rate sensor, may also be included in system 100 but are not illustrated in FIG. 1.

An implementation of recording device 162 includes a wearable (e.g., body) camera that records video and/or audio data (e.g., recorded event data), creates metadata, receives messages from other devices, and identifies metadata as audit tags. Recording device 162 may receive data directly from other equipment such as holster 164, CEW 166, and/or vehicle detector 172. Data from other devices may inform recording device 162 of the status of the device that sends the data. For example, data from CEW 166 may inform recording device 162 that CEW 166 is being activated to impede locomotion of a target. Recording device 162 may create metadata responsive to the data from CEW 166. Recording device 162 may identify the metadata as an audit tag. Recording device 162 may categorize the audit tag as urgent or non-urgent.

Recording device 162 may communicate (e.g., send, receive) with other devices such as MDT 174 and/or electronic device 150. Recording device 162 may further communicate with dispatch system 110 and server 120 via network 130 and/or dock 140. Communications with other devices may result in the creation of metadata by recording device 162, identification of the metadata as an audit tag, and/or characterization of the audit tag.

Data recorded by a recording device may be transferred, in real-time or sometime after recording, to server 120. Transfer of data from one or more recording devices may be accomplished by direct communication of a recording device with server 120 via network 130 or via an intermediary device, such as MDT 174 or handheld electronic device 150.

Holster 164 may perform the functions of a recording device by recording data related to the removal from or placement of a firearm in holster 164. Holster 164 may transmit its recorded data to server 120 for storage and/or audit. Holster 164 may create metadata related to the recorded data. Holster 164 may identify metadata as audit tags and categorize the audit tags. Holster 164 may further transmit a message each time a weapon is removed from holster 164. Recording device 162 may receive such a message, create metadata responsive to receiving the message, identity the metadata as an audit tag, and categorize the audit tag. The audit tag created by recording device 162 relates the function of holster 164 to the data recorded by recording device 162.

CEW 166 may perform the functions of a recording device by recording the operations performed by CEW 166 such as arming, activation, cartridge replacement, pulse per second generated, charge per pulse delivered to a target, and number of activations. CEW 166 may transmit its recorded data and metadata to server 120 for storage and/or audit. CEW 166 may create metadata related to the recorded data. Holster 164 may identify metadata as audit tags and categorize the audit tags. CEW 166 may further transmit a message each time CEW 166 performs a function or a subset of the functions (e.g., arming, activation). Recording device 162 may receive such messages, create metadata responsive to receiving the message, identity the metadata as an audit tag, and categorize the audit tag. The audit tag created by recording device 162 relates the operation of CEW 166 to the data recorded by recording device 162.

Vehicle detector 172 may perform the functions of a recording device by recording the operations performed by vehicle 170. Vehicle operations detected by vehicle detector 172 may include switching on the lights of a cruiser, switching on the siren of a cruiser, rapid acceleration of a cruiser, traveling in a cruiser above a threshold speed, opening of a door of a cruiser, and removal of a shotgun from a vehicular shotgun holder. Vehicle detector 172 may transmit its recorded data and metadata to server 120 for storage and/or audit. Vehicle detector 172 may create metadata related to the recorded data. Vehicle detector 172 may identify metadata as audit tags and categorize the audit tags. Vehicle operations may provide advanced warning of a possible event and/or the severity of the event, which may be used to identify metadata as an audit tag and to categorize the audit tag. Vehicle detector 172 may transmit its recorded data and metadata to server 120 for storage and/or audit.

Vehicle detector 172 may further transmit a message each time it detects one or more operations of vehicle 170. Recording device 162 may receive such messages, create metadata responsive to receiving the message, identity the metadata as an audit tag, and categorize the audit tag. The audit tag created by recording device 162 relates the operations of vehicle 170 to the data recorded by recording device 162.

Vehicle 170 may include a MDT 174. MDT 174 may communicate with vehicle detector 172, recording device 162, and/or electronic device 150. MDT 174 may further communicate with server 120 or dispatch system 110 via network 130. MDT 174 may function as an intermediary for communications between devices such as recording device 162 and electronic device 150, server 120, or dispatch system 110.

A network enables electronic communications between electronic devices. Electronic devices may exchange (e.g., communicate) data via a network. A network may include nodes. Data may be transferred between nodes. A communication link (e.g., wired, wireless) permits the transfer of information between nodes of the network. Recording device 162, electronic device 150, MDT 174, server 120, and/or dispatch system 110 may perform the functions of a node. In an implementation, network 130 performs the functions of a network described herein.

Dispatch system 110 may communicate with one or more recording devices and/or electronic device 150 using any suitable communication protocol, including 2G, 3G, 4G, LTE, or a similar, long-range, wireless protocols; short message service (SMS) messages, selective calling, or any other suitable technique. Dispatch system 110 may communicate directly with recording devices 162 or may communicate with recording devices via electronic device 150. A recording device that receives a message from dispatch system 110 may create metadata related to the message, identify the metadata as an audit tag, and categorize the audit tag as urgent or non-urgent. The audit tag created by the recording device relates the message from dispatch 110 to the data recorded by recording device 162.

Electronic device 150 may establish a communication path between recording device 162 and server 120 via network 130 for communication of recording device 162 with server 120. Electronic device 150 may communicate with one or more recording devices, and may also communicate with other devices such as vehicle detector 172 of vehicle 170, and MDT 174 using any conventional short-range wireless communication protocol. Electronic device 150 may be a laptop computing device, a tablet computing device, a smart phone, or any other suitable computing device carried by user 160.

An evidence management system receives, provides, manages, and/or stores evidence. An evidence management system may store evidence recorded by a security agency. Evidence may include recorded data from a recording device such as recording device 162, holster 164, and/or CEW 166. Evidence may include audiovisual information, and/or operational information from a CEW, a holster, a vehicle, or other equipment. Evidence may be stored on servers and accessed via a network. An evidence management system may include a server to perform the functions of an evidence management system.

Server 120 may perform some or all of the functions of an evidence management system. Server 120 may include one or more servers and/or computing devices. Server 120 may control other electronic devices to perform the functions of evidence management system. Server 120 may include engines and data stores which operate to store and process data and metadata received from recording devices. Server 120 may communicate with devices such as recording device 162, electronic device 150, and MDT 174 via network 130. Server 120 may also communicate with dispatch system 110 via network 130. Server 120 may at least receive data and/or metadata from holster 164 and CEW 166 at least via another electronic device. Further aspects of these devices and their capabilities are discussed herein.

A recording device, an electronic device, an MDT, a dock, and/or any combination of these devices alone or in cooperation with each other may transfer recorded data and metadata from a recording device to a server. While recorded data and metadata is stored on a recording device and during transfer, it is desirable that the recorded data and/or metadata is protected against alteration so that the integrity of the recorded data and/or metadata may be maintained so that the recorded data and/or metadata may be used as evidence.

A recording device may record data for an entire day (e.g., at least 24 hours) or an entire shift (e.g., at least 8-12 hours) before uploading the recorded data and metadata to a server. Recorded data and metadata may be broken (e.g., separated, allocated) into smaller segments for storage, signing, and/or transmission. For example, audiovisual recorded data may be stored in two minute segments. The length of a segment of recorded data and/or metadata may be adjusted to improve data processing, transmission, and performance of the recording device.

While a recording device is capturing data, generating metadata, and/or storing recorded data and metadata, the validity and authenticity of the data may be protected by the physical integrity of the recording device. In order for a person to maliciously interfere with the recording of information, the person would need to physically open (e.g., breach) the case enclosing the recording device. The person would need to intercept data after capture but before the data can be stored in a data store.

During capture or generation of metadata, or shortly thereafter, a signature may be calculated by the recording device for each segment of recorded data and/or metadata. A signature (e.g., hash, cryptographic signature) calculated for each recorded segment may be used to mathematically prove that the segment of data was created by a particular recording device. A signature may show that the segment has not been altered after being recorded. A signature may include time information such that it is possible to determine the time (e.g., date, time of day) at which the recorded data was signed. A signature may include geolocation information such that geographic location where the recorded data was signed may be determined.

A file of recorded data and/or metadata may include one or more segments of recorded data and/or metadata. In addition to signing each segment, a file may be additionally signed to protect the file from alteration.

A segment or a file of data may be signed by the recording device soon after it is closed thereby protecting the data as soon as possible.

Transfer of recorded data from the recording device to a server, or other system, is another opportunity for a person to attack the recorded data. Encryption may be used while transferring the data from the recording device to another device to protect the integrity of the data. Each device that receives recorded data may sign the data to provide additional protection against tampering or to provide traceability to determine where tampering occurred. Signatures may be verified for each level or step where a signature is added.

Once a server has received recorded data and/or metadata, the server may verify the signatures on the data to determine the authenticity and the absence of tampering. A server may protect recorded data and/or metadata from tampering by using any conventional techniques to protect data from tampering and/or authenticating the data such as signatures, limited access to the original data, and by making the recorded data and/or metadata read only.

A recording device (e.g., camera, infrared camera microphone, GPS receiver, electronic compass, electronic gyroscope) detects (e.g., captures) physical properties in an environment and records (e.g., stores) the information (e.g., data) regarding the physical properties. Information that is captured and recorded is referred to herein as recorded data (e.g., captured data, recorded event data). Recorded data may be analyzed to determine characteristics of the physical properties detected and recorded. Recorded data may be analyzed to detect and/or understand the occurrences of an event.

Recorded data may relate to an event (e.g., incident). Recorded data may provide a record of an event and the occurrences that took place during the event. Recorded data may be used as evidence to establish the occurrences of an event.

A recording device may communicate (e.g., transmit data, receive data) with another electronic device or server. A recording device may include any conventional communication circuitry for transmitting and/or receiving data. A recording device may use any conventional wired (e.g., LAN, Ethernet) or wireless (e.g., BLUETOOTH®, BLUETOOTH® Low Energy (BLE), WiFi, ZIGBEE®, 2G, 3G, 4G, WIMAX®) communication protocol. A recording device may communicate with other electronic devices via a short-range wireless communication link. A recording device may communicate with a network and via the network with a server. A recording device may communicate with a network using a long-range communication protocol.

One type of recording device may detect and record visual (e.g., video, related to light) physical properties and/or audible (e.g., audio, related to sound) physical properties. Visual and audible detected properties together may be referred to as audiovisual data, video and audio data, or merely video data. As used herein, "audiovisual" information, data, recordings, or recorded data refers to video that includes audio, video that is associated with separate audio of the video scene, or audio alone. Use of the term video data may refer to both video and audio data together.

Visual and/or audible physical properties detected and recorded by a recording device may be within the range of vision and/or hearing of a human. Visual and/or audible physical properties detected and recorded may be outside the range of vision and/or hearing of a human. The capture and storing of video and/or audio data may be accomplished using any suitable technique and/or device.

Data stored by a recording device that records audiovisual data may be stored in any suitable format, including but not limited to H.264, MPEG-4, AAC, and WAV. A recording device may convert the captured data from one format (e.g., analog data, encoding) to another format (e.g., digital data, encoding).

A recording device may communicate (e.g., transmit, receive) captured and/or recorded data. A recording device may transmit data to another system (e.g., server, electronic device). A recording device may store data for a given period (e.g., event, shift, day) then transmit the data to another system. A recording system may transmit information to another system as it is captured (e.g., live streaming).

As described above, a recording device may additionally generate and/or receive metadata.

A data store as described herein may include any suitable device configured to store data for access by a computing device. A data store receives data. A data store retains (e.g., stores) data. A data store retrieves data. A data store provides data for use by a system, such as an engine. A data store may organize data for storage. A data store may organize data as a database for storage and/or retrieval. The operations of organizing data for storage in or retrieval from a database of a data store may be performed by a data store. A data store may include a repository for persistently storing and managing collections of data. A data store may store files that are not organized in a database. Data in a data store may be stored in a computer-readable medium. Computer-readable medium may include memory. A memory may include any conventional technology (e.g., solid-state, magnetoresistive, resistive, ferroelectric).

A data store may be implemented using any conventional memory, such as ROM, RAM, Flash, or EPROM. A data store may be implemented using a hard drive.

One example of a data store suitable for use with the high capacity needs of server 120 is a highly reliable, high-speed relational database management system ("RDBMS") executing on one or more computing devices and accessible over a high-speed network. However, any other suitable storage technique and/or device capable of quickly and reliably providing the stored data in response to queries may be used, such as a key-value store and an object database.

In an implementation, data stores 250-254 and 440-444 perform the functions of a data store discussed herein. For example, recorded data and metadata may be stored in data stores on server 120. Recorded data, including audiovisual data, generated by one or more recording devices may be stored in recorded data store 440. Metadata, including metadata identified as audit tags, may be stored in audit data store 442. Metadata such as recording device serial numbers may be stored in recording device data store 444.

Separate data stores discussed herein may be combined into a single data store, and/or a single data store may be separated into multiple data stores.

The term engine as used herein refers to, in general, circuitry, logic embodied in hardware and/or software instructions executable by a processor of a computing device. Circuitry includes any circuit and/or electrical/electronic subsystem for performing a function. Logic embedded in hardware includes any circuitry that performs a predetermined operation or predetermined sequence of operations. Examples of logic embedded in hardware include standard logic gates, application specific integrated circuits ("ASICs"), field-programmable gate arrays ("FPGAs"), microcell arrays, programmable logic arrays ("PLAs"), programmable array logic ("PALs"), complex programmable logic devices ("CPLDs"), erasable programmable logic devices ("EPLDs"), and programmable logic controllers ("PLCs"). Logic embodied in (e.g., implemented as) software instructions may be written in any programming language, including but not limited to C, C++, COBOL, JAVA®, PHP, Perl, HTML, CSS, JAVASCRIPT®, VBScript, ASPX, HDL, and/or MICROSOFT® .NET™ programming languages such as C#. The software for an engine may be compiled into an executable program or written in an interpreted programming language for execution by a suitable interpreter or virtual machine executed by a processing circuit. Engines may be callable (e.g., executable, controllable) from other engines or from themselves.

Generally, the engines described herein can be merged with other engines, other applications, or may be divided into sub-engines. Engines that are implemented as logic embedded in software may be stored in any type of computer-readable medium. An engine may be stored on and executed by one or more general purpose computers, thus creating a special purpose computer configured to perform the functions of (e.g., provide) the engine.

A computing device may perform the functions of an engine.

A computing device may perform a function. A computing device may provide a result of performing a function. A computing device may receive information, manipulate the received information, and provide the manipulated information. A computing device may execute a stored program to perform a function.

A computing device may provide and/or receive digital data via a conventional bus using any conventional protocol. A computing device may provide and/or receive digital data via a network connection. A computing device may store information and retrieve stored information. Information received, stored, and/or manipulated by the computing device may be used to perform a function and/or to perform a stored program.

A computing device may control the operation and/or function of other circuits and/or components of a system. A computing device may receive status information regarding the operation of other components, perform calculations with respect to the status information, and provide commands (e.g., instructions) to one or more other components for the component to start operation, continue operation, alter operation, suspend operation, or cease operation. Commands and/or status may be communicated between a computing device and other circuits and/or components via any type of bus including any type of conventional data/address bus.

For example, computing device 500 is an embodiment of a computing device. Computing device 500 performs the functions of a computing device discussed herein. Computing device 500 may include processing circuit 512, computer-readable medium 514, communication circuit 516, and a bus. A bus includes any conventional control bus, address bus, and/or data bus (e.g., internal bus, expansion bus, local bus, front-side-bus, USB, FIREWIRE®, Serial ATA, AGP, PCI express, PCI, HYPERTRANSPORT®, INFINIBAND®, EISA, NuBus, MicroChannel, SBus, I2C, HIPPI, CAN bus, FutureBus). A communication bus may use any protocol, whether conventional or custom (e.g., application specific, proprietary) to transfer data.

Computing device 500 describes various elements that are common to many different types of computing devices. Computing device 500 may perform the functions of a server, a computer, a mobile phone, a smart phone, a tablet, and many other electronic devices and systems.

A processing circuit, also referred to as a processor, includes any circuitry and/or electrical/electronic subsystem for performing a function. A processing circuit may include circuitry that performs (e.g., executes) a stored program. A processing circuit may include a digital signal processor, a microcontroller, a microprocessor, an application specific integrated circuit, a programmable logic device, logic circuitry, state machines, MEMS devices, signal conditioning circuitry, communication circuitry, a radio, data busses, address busses, and/or a combination thereof in any quantity suitable for performing a function and/or executing one or more stored programs.

A processing circuit may further include conventional passive electronic devices (e.g., resistors, capacitors, inductors) and/or active electronic devices (op amps, comparators, analog-to-digital converters, digital-to-analog converters, programmable logic). A processing circuit may include conventional data buses, output ports, input ports, timers, memory, and arithmetic units.

A processing circuit may provide and/or receive electrical signals whether digital and/or analog in form. A processing circuit may provide and/or receive digital data.

Figure 2:
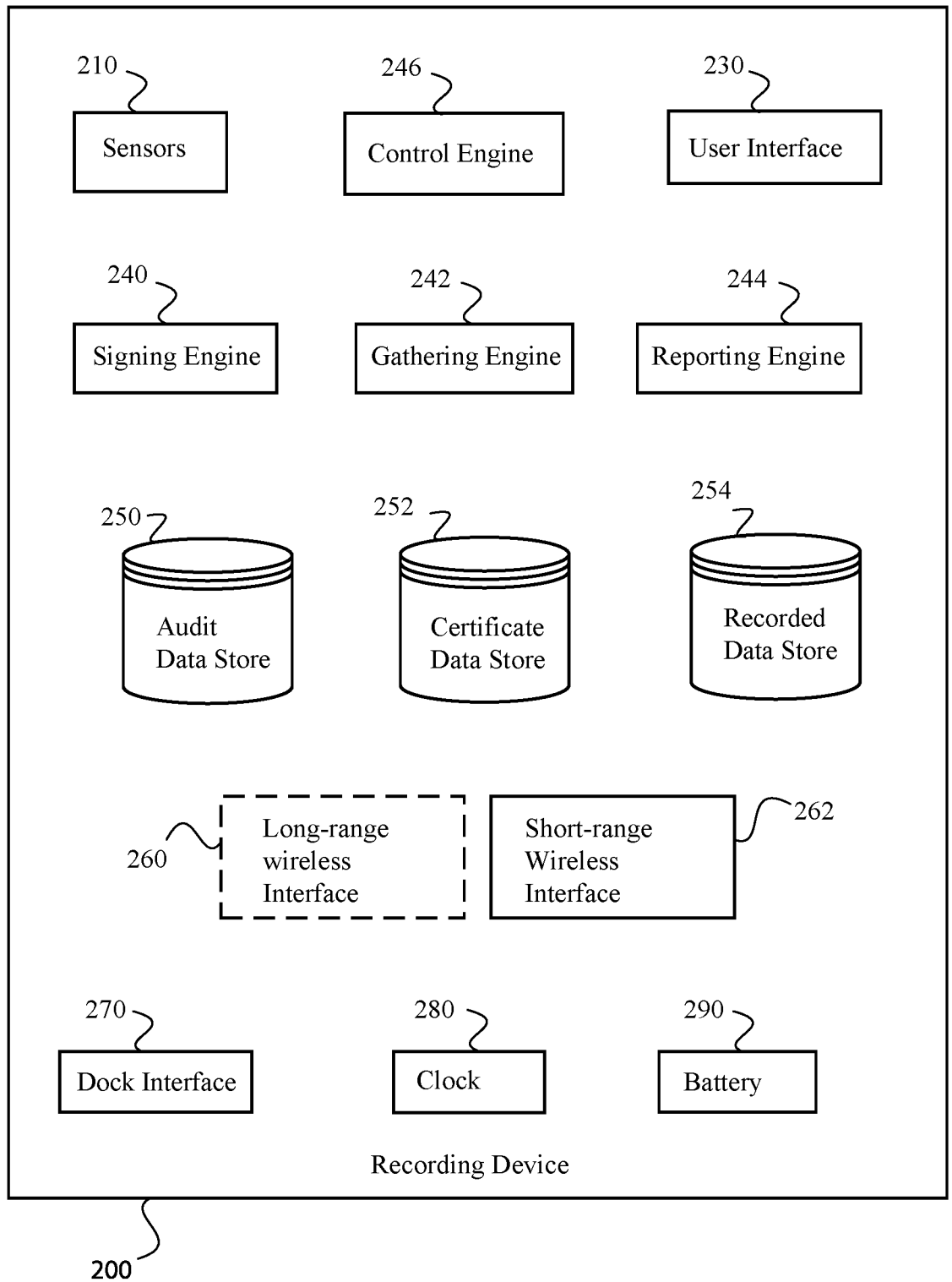
FIG. 2 is a block diagram of a recording device.

Recording device 200, shown in FIG. 2, is an implementation of a recording device. Recording device 200 performs the functions of a recording device as discussed herein. In particular, recording device 200 may perform the functions of recording device 162 that records audiovisual data. Recording device 200 includes sensors 210, user interface 230, engines 240-246, data stores 250-254, wireless interface 260 ("long-range"), wireless interface 262 ("short-range"), dock interface 270, clock 280, and battery 290. Recording device 200 includes signing engine 240, gathering engine 242, reporting engine 244, and control engine 246. Recording device 200 includes one or more data stores, including audit data store 250, certificate data store 252 and recorded data store 254.

Sensors 210 detect physical properties. Sensors provide data regarding detected physical properties. Sensors 210 enable recording device 200 to capture information (e.g., data) regarding an event or the occurrences of an event. Sensors 210 may include any sensor that detects and provides data regarding physical properties include photo sensors (e.g., body camera), audio sensors (e.g., body camera), capacitive sensors (e.g., holster), inductive sensors (e.g., holster), and electrical sensors (e.g., CEW). The data provided by sensors 210 may be used by other components of recording device 200.

Data collected by sensors 210 may be stored in recorded data store 254. Data from all sensor types may be stored in combined and/or separate files in recorded data store 254.

Clock 280 may be used by gathering engine 242, reporting engine 244, control engine 246, or any other component of recording device 200 to coordinate operation and/or generate timestamps for data.

Dock interface 270 may be configured to cooperate with dock 140 to establish a communication link for transferring recorded data and metadata from recording device 200 to another device such as server 120. The communication link may be established via a wired or wireless communication link. In an implementation, dock interface 270 may include a female 2.5 mm socket, which mates with a male 2.5 mm plug of dock 140.

Once docked, recording device 200 may then transfer data to server 120 via the connection using any suitable protocol. Power may be transferred to recording device 200 via dock interface 270 instead of or in addition to data transfer. In another implementation, other connection hardware that can provide both power and data connectivity may be used, such as a USB connector, a FIREWIRE® connector, or any other conventional connector.

Long-range wireless interface 260 may establish communication between recording device 200 and one or more electronic devices via network 130. Wireless interface 260 may use any suitable wireless protocol. Wireless interface 260 may establish communication with dispatch system 110, record management system 410 and server 210 via network 130. Communication protocols used may include but are not limited to internet data communication over 3G, 4G, and/or LTE.

Short-range wireless interface 262 may use any suitable wireless networking technology capable of establishing a wireless communication link when devices such as electronic device 150, recording device 162, recording device 200, holster 164, CEW 166, vehicle detector 172, dock 140, and MDT 174 are proximate to (e.g., within 100 meters of) each other. Wireless interface may use any suitable wireless communication protocol including BLUETOOTH®, BLUETOOTH® Low Energy (BLE), ZIGBEE®, and/or near-field communication (NFC).

Signing engine 240 may be configured to use one or more signing certificates from certificate data store 252 to apply a digital signature to recorded data and/or metadata. Recorded data and metadata may be stored and signed together. Recorded data may be signed separately from metadata. Metadata that is identified as an audit tag may be signed separately from metadata that is not identified as an audit tag. An audit tag that is categorized as urgent may be signed separately from an audit tag that is not categorized as urgent.

As discussed above signing protects recorded data and metadata from tampering. Signing may be accomplished as recorded data and metadata is stored or when a sufficient amount of recorded data and metadata is available for signing. Signing engine may use any conventional techniques for signing and storing recorded data and metadata.

Signed data may be stored in recorded data store 254 and/or audit data store 250. In an embodiment, all recorded data and metadata are signed and stored in recorded data store 254. A copy of metadata identified as audit tags and categorized as urgent are separately signed and stored in audit data store for transfer to a server as soon as possible so the server may track and verify the receipt of the recorded data associated with the audit tags. In another implementation, all recorded data is signed and stored in recorded data store 254. All metadata is signed and stored in audit data store 250. Signed metadata is sent to a server as soon as available. The server inspects the metadata, finds all of the metadata identified as audit tags that are categorized as urgent, and uses the audit tags to track receipt of recorded data from recording device 200 at a later time. The server may retain all of the metadata so that recording device 200 does not need to resend the metadata or recording device 200 may resend the metadata from audit data store 250 when the recorded data from recorded data store 254 is transferred to the server.

Cryptographic keys and functions for performing a hash used in digitally signing recorded data and metadata may be stored in certificate data store 252.

Gathering engine 242 performs the function of gathering (e.g., receiving, collecting, aggregating) recorded data and metadata for storing and/or signing. Gathering engine 242 may receive recorded data and/or metadata from one or more components of recording device 162. For example, gathering engine 242 may receive recorded data from sensors 210.

Gathering engine 242 may receive information from wireless interface 262 from other proximate devices (e.g., CEW 166, holster 164, electronic device 150, vehicle detector 172, MDT 174). Gathering engine 242 may receive information from remote devices (e.g., dispatch system 110, server 120) via wireless interface 260. Responsive to information received via wireless interface 260 and/or wireless interface 262, gathering engine 242 may generate metadata.

Gathering engine 242 may monitor the operation of recording device 200 and generate metadata. For example, the operating states of sensors 210, wireless interface 260, wireless interface 262, dock interface 270, clock 280, and battery 290 may be recorded as metadata. For example, metadata for any component of recording device 200 may include any faults or exceptions (e.g., low battery level, dock not recognized, no light detected by sensors, no sound detected by sensors, clock inaccurate) that occur. Metadata for the operating state of recording device 200 may include the various operating states of components of recording device 200. For example, metadata related to sensors 210 may include the saturation level, the hue settings, and the intensity of detected light or sound. Metadata for wireless interface 260 or wireless interface 262 may include their provisioning values for communication.

Gathering engine 242 may identify metadata data as audit tags. Gathering engine 242 may use any conventional methods for determining which metadata should be identified as an audit tag including accessing a look-up table that lists information in metadata that would result in the metadata being identified as an audit tag. Gathering engine 242 may categorize audit tags as being urgent or non-urgent. Any method, including a look-up table, may be used to determine whether an audit tag should be categorized as urgent or non-urgent.

Gathering engine 242 in cooperation with or in place of signing engine 240 may provide (e.g., transfer) recorded data and/or metadata to signing engine 240 for signing and/or storing signed recorded data and/or metadata in an appropriate data store.

Reporting engine 244 reports (e.g., transfers, transmits, sends) metadata to a server, such as server 120. Reporting engine 244 may transfer all metadata or just metadata that has been identified as an audit tag and categorized as urgent as discussed above. Reporting engine 244 may transfer metadata to server 120 directly via long-range wireless interface 260 or indirectly via short-range wireless interface 262 and electronic device 150.

Reporting engine 244 may further transfer all recorded data and/or metadata to server 120 via dock interface 270 when recording device 200 establishes a communication link with dock 140.

Control engine 246 performs the functions of recording device 200. Control engine 246 may control and/or coordinate the operation of the components (e.g., 210, 230, 260, 262, 270, 280, 290), data stores (e.g., 250, 252, 254), and/or engines (e.g., 240, 242, 244) to perform the operations of recording device 200. In an implementation, control engine 246 operates so that recording device 200 performs the functions of a body camera.

For example, control engine 246 may cause sensors 210 to begin obtaining (e.g., capturing) data. Control engine 246 may change the operational settings of sensors 210 (e.g., image quality, resolution, white balance, gain) or any other component of recording device 200. Control engine 246 may control and/or cooperate with gathering engine 242 to store the captured video and/or audio data in recorded data store 254. Control engine 246 may receive commands to start, pause, or stop an operation of recording device 200 from user interface 230 (e.g., buttons, switches, touch screen). Responsive to commands from user interface 230, control engine 246 controls the operation of recording device 200. Control engine may receive information from other components (e.g., status) such as clock 280, dock interface 270, and battery 290 and may perform and/or control the performance of a function responsive to the status.

Control engine 246 may control and/or cooperate with gathering engine 242 to generate metadata responsive to information from wireless interfaces 260 and/or 262. Control engine 246 may control and/or cooperate with signing engine 240, gathering engine 242, and/or reporting engine 244 to perform the functions of signing engine 240, gathering engine 242, and/or reporting engine 244 as discussed herein.

As discussed above, metadata that has been identified as an audit tag and categorized as urgent may be sent by recording device 200 to server 120. Agencies may define what types of event and/or occurrences of an event should be identified for auditing and whether or not such events or occurrences are urgent or non-urgent.

Upon receiving audit tags that are categorized as urgent, a server may provide (e.g., send, transmit) notices (e.g., alerts) regarding the audit tags. The server may send audit tags to personnel or machines (e.g., servers) of an agency that should be advised of a possible event or occurrence that may be urgent or a sign that a dangerous situation is in progress. For example, notices may be sent to a shift supervisor, a commander, a dispatch computer (e.g., request backup), and a dispatcher.

As discussed above, audit tags may be provided to the server before the recorded data associated with the audit tag is provided to the server. Upon receiving an alert, the person or machine, may send a request to the recording device to request that the recording device send the recorded data as soon as possible for inspection. Sending the recorded data responsive to a request may include live-streaming the video from recording device 200 to server 120.

Figure 3:
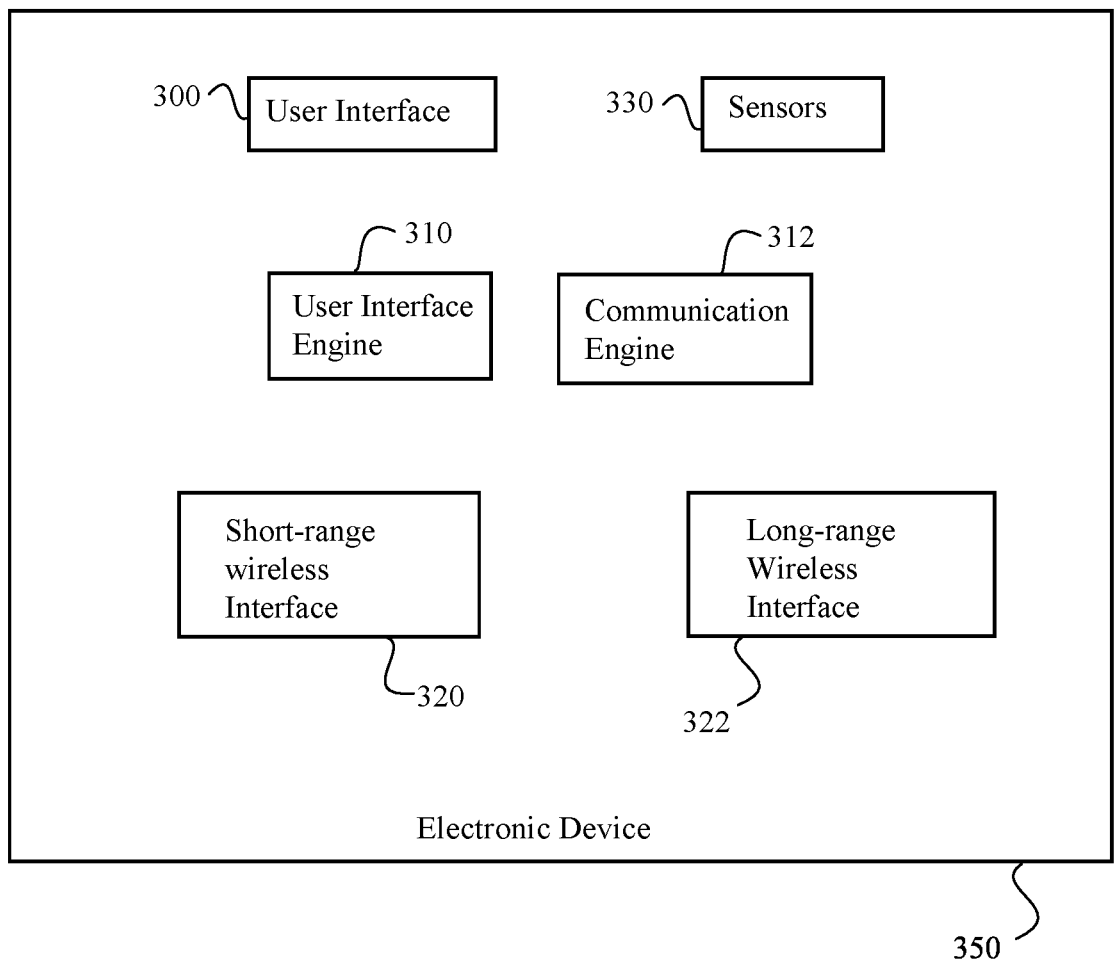
FIG. 3 is a block diagram of a handheld electronic device.

Electronic device 350, shown in FIG. 3, is an implementation of an electronic device. Electronic device 350 performs the functions of an electronic device discussed above. Electronic device 150 includes user interface 300, user interface engine 310, communication engine 312, short-range wireless interface 320, long-range wireless interface 322, and sensors 330.

User interface 300 may include buttons, switches, status lights, a display, a touch-screen display, and/or a speaker. User interface engine 310 may control or cooperate with user interface 300 to present information to user 160 and receive information from user 160 via user interface 300. User interface 300 may enable user 160 to control one or more recording devices, add metadata to an event recorded by a recording device, identify metadata as an audit tag, categorize audit tags as urgent or non-urgent, and/or manually initiate upload of urgent audit tags to server 120, and/or take other actions within system 100.

Communication engine 312 may be configured to manage communication with one or more recording devices via short-range wireless interface 320. Communication engine 312 may be configured to additionally manage communication with server 120 and dispatch system 110 via long-range wireless interface 322.

Short-range wireless interface 320 allows electronic device 150 to communicate with the other devices of system 100 when they are within range. Short-range wireless interface 320 may communicate with one or more of recording device 162, holster 164, CEW 166, vehicle detector 172 and MDT 174. Short-range wireless communication may be established using any conventional wireless communication protocol such as BLUETOOTH®, BLUETOOTH® Low Energy (BLE), ZIGBEE®, IrDA, ANT, ANT+, 802.15.4, and/or near-field communication ("NFC").

Long-range wireless interface 322 may establish communication between electronic device 150 and server 120 and/or dispatch system 110 via network 130. Long-range communication may be established using any conventional communication protocol such as 2G, 3G, 4G, LTE, and/or WiFi.

Sensors 330 allow electronic device 150 to collect data. Sensors 330 may include a GPS receiver that determines the geographic position of electronic device 150.

Figure 4:
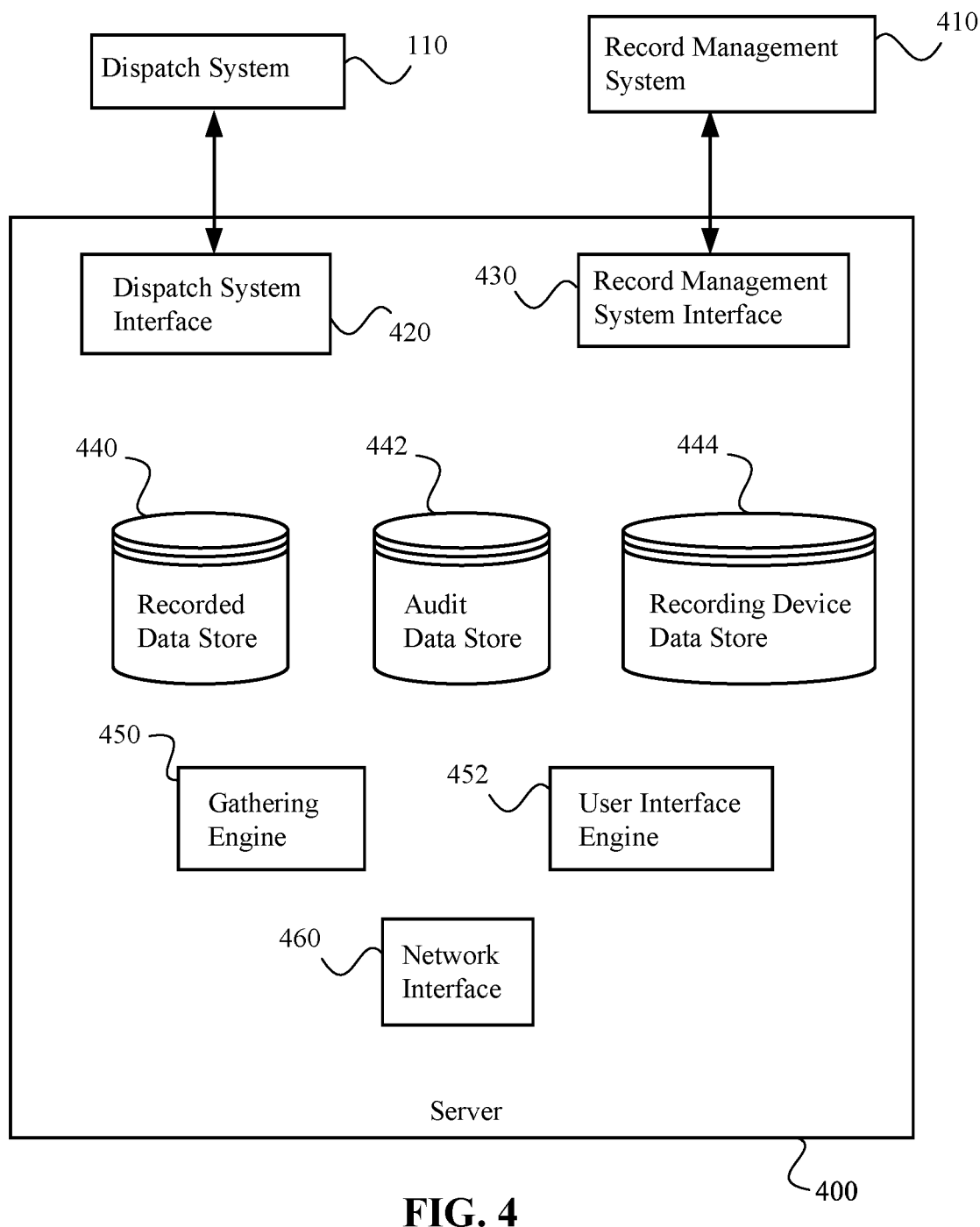
FIG. 4 is a block diagram of a server which performs the functions of an evidence management system.
Figure 5:
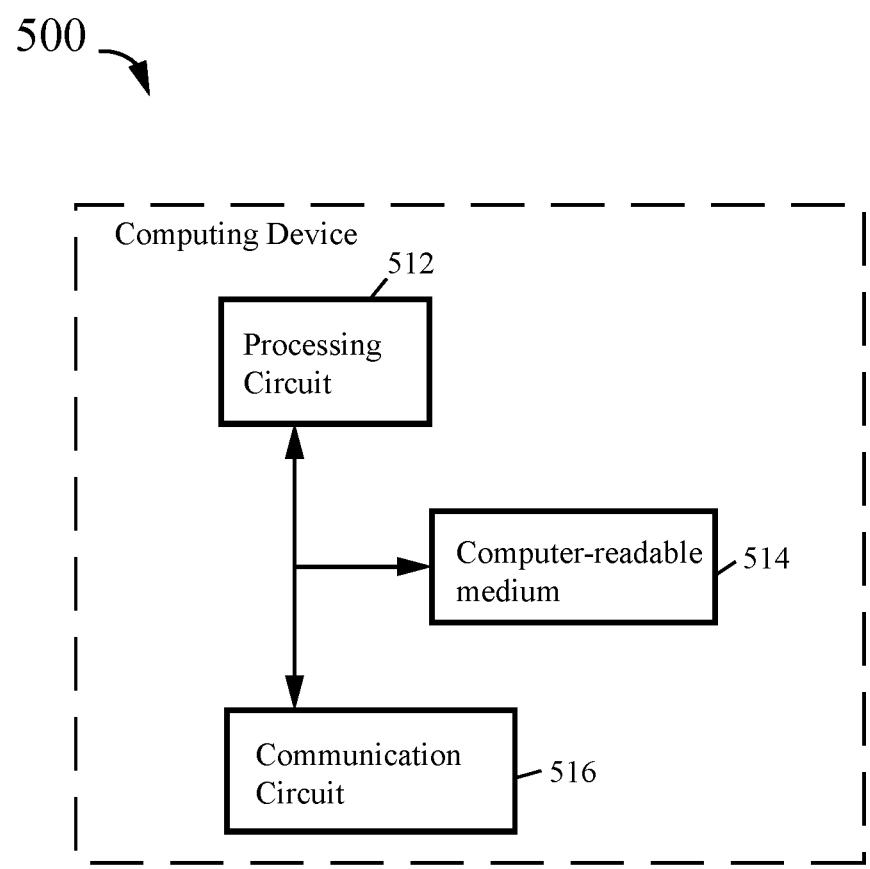
FIG. 5 is a functional block diagram of a computing device.

Server 400, shown in FIG. 4, is an implementation of a server. Server 400 performs the functions of a server discussed above, including the functions of server 120. Server 400 may further perform the functions of an evidence management system discussed herein. Server 400 may include a single server, a server farm, and/or a cloud server service.

Server 120 includes dispatch system interface 420, record management system interface 430, data stores 440-444, gathering engine 450, user interface engine 452, and network interface 460.

Dispatch system interface 420 may enable server 400 to communicate with one or more dispatch systems, such as dispatch system 110, of one or more security agencies. Server 400 may receive (e.g., import) information from dispatch system 110. Information sent by dispatch system 110 may include incident codes, geographic locations of user 160 or vehicle 170 at specific times, as well as event start and/or stop information. Server 120 may receive transmit information from dispatch system 110 to one or more recording devices. A recording device that receives information from dispatch system 110 may create metadata that includes some or all of the information to describe the recorded data being recorded.

Record management system interface 430 enables server 120 to communicate with a record management system 410 of one or more agencies. Server 120 may import information from a management system such as case numbers, officer badge numbers, or other information related to the agency, agency activities, agency equipment, and/or agency personnel. Information from record management system 410 may be transmitted by server 120 to one or more recording device. A recording device that receives information from a record management system may create metadata that includes some or all of the information to describe the recorded data being recorded.

Record management system interface 430 may also provide information from server 120 to record management system 410. Information provided to record management system 410 may include links to data stored in recorded data store 440, and/or copies of metadata stored in audit data store 442.

Server 400 includes recorded data store 440, audit data store 442, and recording device data store 444.

Recorded data store 440 may be configured to store recorded data and/or metadata from one or more recording devices of system 100. Recorded data store 440 may store the same type of data stored in recorded data store as discussed above.

Audit data store 442 may store the same type of data stored in audit data store 250 discussed above.

Recording device data store 444 may be configured to store information associated with one or more components (e.g., recording devices, equipment, users) of system 100. For example, for recording device 162/200, recording device data store 444 may store information such as a unique device identifier, an identifier (e.g., a badge number) of user 160 associated with recording device 162/200 at a given time or date, a capability of recording device 162/200, and/or any other conventional information associated with recording device 162/200.

Gathering engine 450 receives recorded data and metadata from one or more recording devices. Gathering engine 450 may further perform the functions of verifying that the recorded data associated with received audit tags is eventually received by server 400. Gather engine 450 performs all the functions performed by a server discussed herein related to recorded data, metadata, and audit tags, whether categorized as urgent or non-urgent.

User interface engine 452 provides a user interface for enabling humans to provide information to and receive information from server 400. User interface 452 may include web pages, application programming interfaces, or any other suitable technology.

Figure 6A:
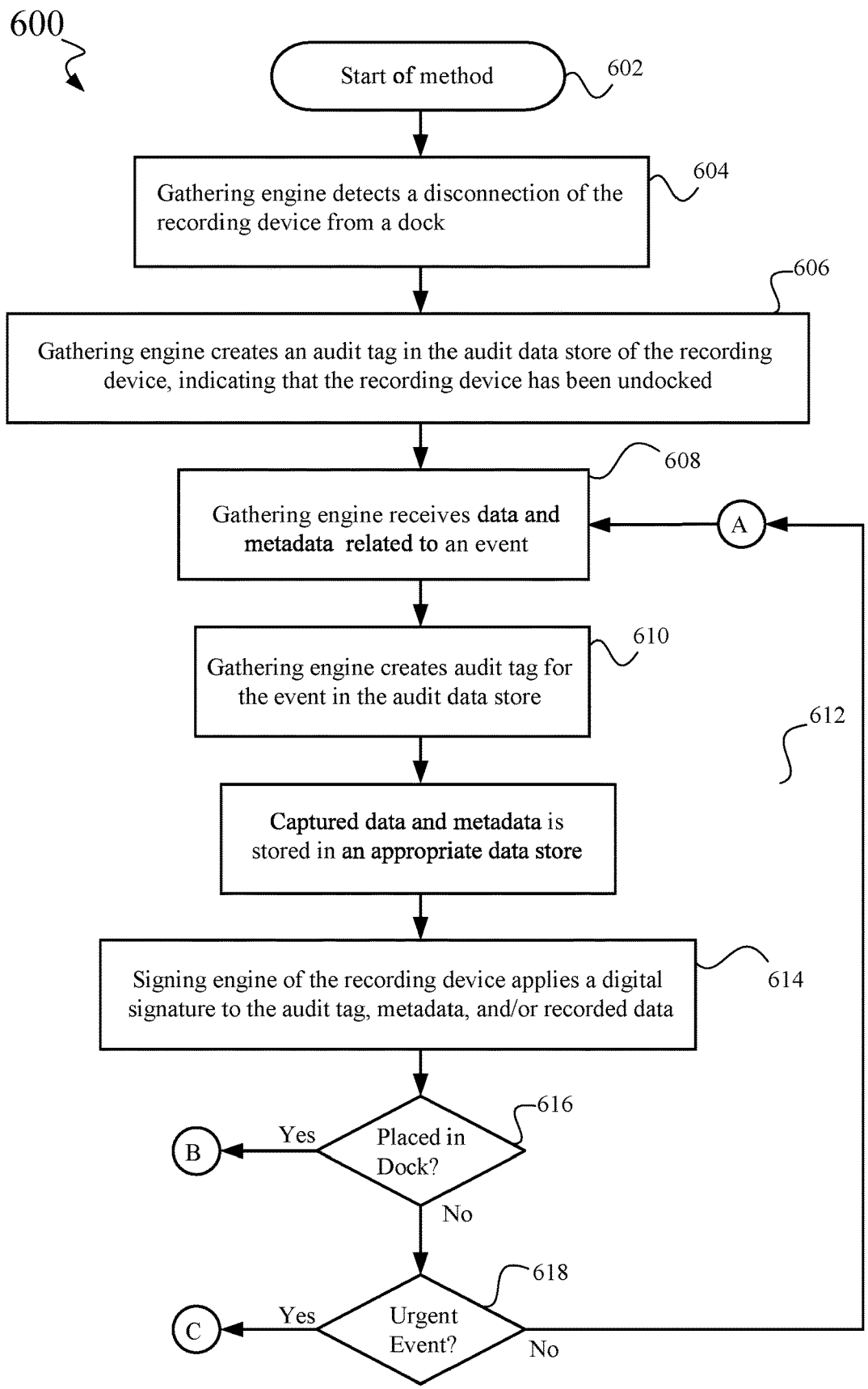
FIGS. 6A and 6B illustrate a method performed by a recording device for auditing recording device activity.
Figure 6B:
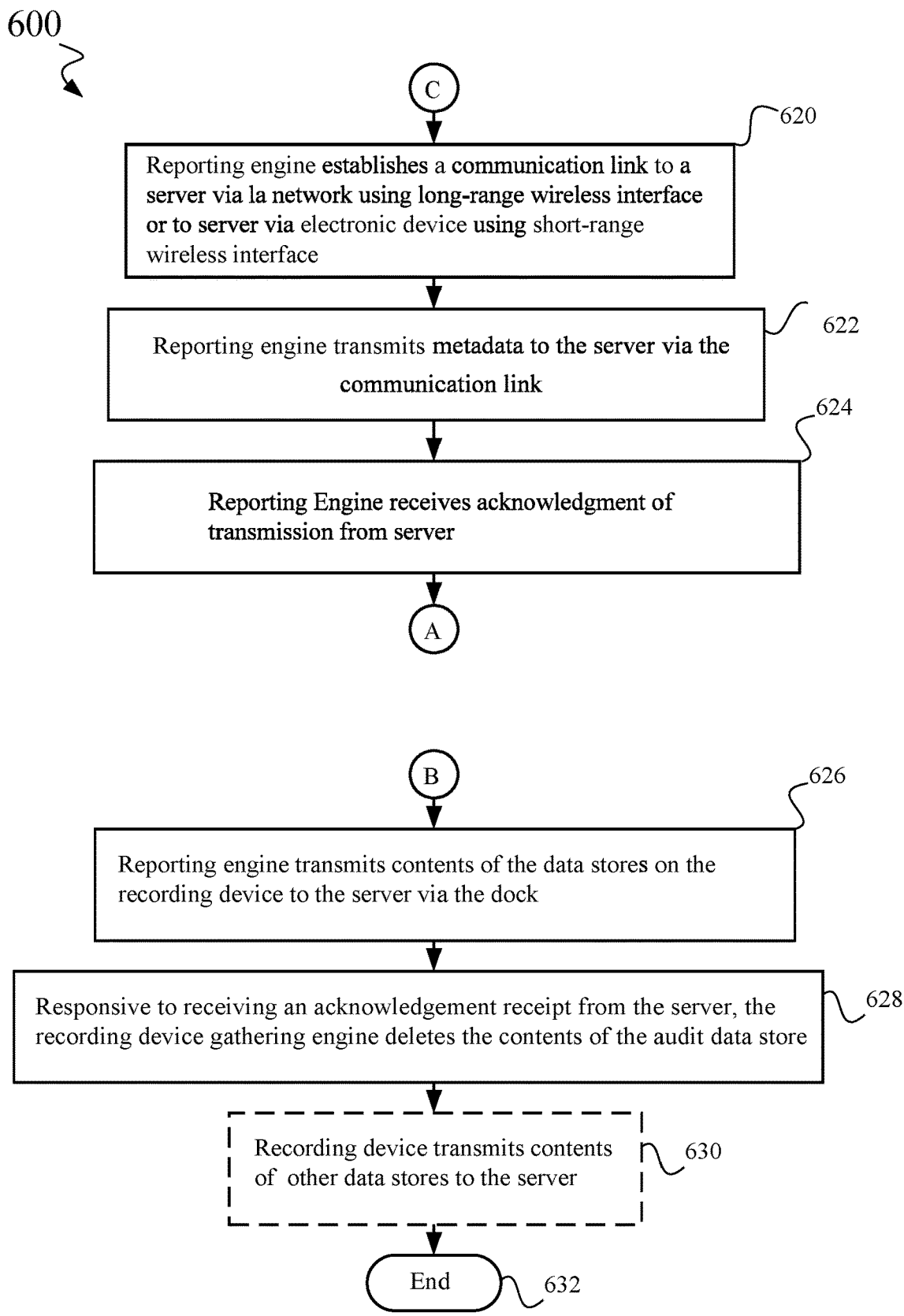

FIGS. 6A-6B illustrate an implementation of a method performed by a recording device for creating metadata that is identified as an audit tag. Although method 600 is described with respect to recording device 162/200, other recording devices such as CEW 166, holster 164, and vehicle detector 172, could perform the same or similar method to achieve the same result.

Method 600 includes blocks start 602, detect 604, create 606, receive 608, create 610, store 612, sign 614, determine 616, urgent 618, connect 620, transmit 622, transmit 624, transmit 626, delete 628, and end 632.

Execution (e.g., performance) of method 600 begins at start 602. Execution moves to detect 604.

In detect 604, the recording device (e.g., gathering engine 242 of recording device 200) detects a disconnection (e.g., separation) of recording device 200 from dock 140 via dock interface 270. Execution moves to create 606

In create 606, the recording device (e.g., gathering engine 242) creates metadata to document the disconnection from dock 140. The recording device may identify the metadata related to disconnection as an audit tag and store the metadata in audit data store 250. The recording device categorizes the metadata associated with disconnection as non-urgent.

In an implementation, where user 160 is a law enforcement officer, disconnection of the recording device from the dock marks the start of a new shift. An audit tag marking disconnection enables easy identification of the start of a new shift. Execution moves to receive 608.

In receive 608, the recording device (e.g., gathering engine 242) receives captured data, and information from other devices (e.g., holster 164, CEW 166, vehicle detector 172, server 120, dispatch system 110). Gathering engine 242 assess the information it receives to determine whether metadata has been received or generated. Gathering engine 242 further determines whether metadata should be identified as one or more audit tags and whether one or more audit tags should be categorized as urgent or non-urgent.

In create 610, the recording device (e.g., gathering engine 242) identifies the metadata identified in receive 608 as audit tags (e.g., creates audit tags) and categorizes the audit tags as urgent or non-urgent as determined in receive 608. Execution moves to store 612.

In store 612, captured data and metadata are stored in appropriate data stores. The various combinations of recorded data, metadata, and metadata identified as audit tags and categorized as urgent or non-urgent are discussed above with respect to recording device 200. Execution moves to sign 614.

In sign 614, the recording device (e.g., signing engine 240) applies a digital signature to recorded data and/or metadata. In an implementation, server 120 may assign a private key to recording device 200, which may be stored in certificate data store 252. The private key may be used by signing engine 240 to encrypt recorded data and/or metadata. A corresponding public key may be used to verify that the encrypted data has not been tampered with since it was signed and/or encrypted. Execution moves to determine 616.

In determine 616, the recording device determines whether it has been reconnected with dock 140. Connection to dock 140 may be detected by an electrical connection made via dock interface 270, and a signal being provided by dock interface 270 to gathering engine 242 accordingly. If the recording device is connected to dock 140, then execution proceeds to transmit 626. Otherwise, execution proceeds to urgent 618.

In transmit 626, the recording device (e.g., reporting engine 244) transmits the content of the data stores of the recording device to server 120 via dock 140. The recording device transfers all recorded data and all metadata to server 120. Execution moves to delete 628.

In delete 628, the recording device receives acknowledgement from server 120 that server 120 has received the data provided by the recording device. The acknowledgement may include information to identify the receipt of specific files and/or segments so that there can be no mistake that the server has properly received the data, so that if the data is deleted from the recording device the data is not lost. Responsive to the acknowledgement, the recording device (e.g., gathering engine 242) deletes the recorded data and metadata whose receipt has been confirmed.

In an implementation, server 120 may provide one acknowledgement receipt for the entire contents of data received. In an implementation, server 120 may provide acknowledgement receipts for subsets (e.g., segments, portions) of the uploaded data. Once acknowledgement is received, each piece of data may be deleted from the data stores of recording device 200. Such an implementation allows an upload of data from the recording device to the server to be interrupted without mistakenly deleting data that was not received by the server. Execution moves to transmit 630.

In transmit 630, a recording device (e.g., recording device 200) transmits contents of any other data stores, if any, to server 120. For example, recording device 162 may transmit the data from certificate data store 252 to server 120 via dock 140. The functions performed by transmit 630 may be optional, because in some implementations, there may not be any such data. Execution moves to end 632 where the method terminates.

In urgent 618, a recording device (e.g., gathering engine 242, reporting engine 244) determines whether any metadata has been identified as an audit tag and categorized as urgent. If there are no urgent audit tags, execution returns to receive 608 to process another file or segment of captured data and any metadata that is received and/or generated. If there are urgent audit tags, execute moves to connect 620.

In connect 620, a recording device (e.g., reporting engine 244) establishes a communication link to server 120. A recording device may establish a communication link to a server via network 130. A recording device may establish a communication link with network 130 using a long-range wireless interface, such as wireless interface 260. The network may be used to communicate with the server. A recording device may establish a communication link with server 120 via electronic device 150. A recording device may establish a communication link with electronic device 150 using a short-range wireless interface, such as wireless interface 262. Electronic device 150 may establish a communication link with network 130 and thereby communicate with the server. Execution proceeds to transmit 622.

In transmit 622, a recording device (e.g., reporting engine 244) may transmit all metadata, metadata identified as audit tags, and/or metadata identified as audit tags and categorized as high priority. The metadata selected for transmission is transmitted to server 120 via the communication link. Transmit 622 may include acknowledgement from server 120 to verify receipt of the transmission by the server. After transmission, the recording device retains the transmitted metadata in a data store for possible retransmission with the associated recorded data via a dock.

Steps 620-624 may be performed after signing recorded data and/or metadata. In the event that a recording device cannot establish a communication link shortly after signing, the recording device may retain (e.g., hold) the metadata that would have been transmitted after signing until a communication link may be established. A recording device may continue capturing data, receiving metadata, generating metadata, signing captured data and metadata, and performing the other functions of a recording device even though a communication link to a server cannot be established. When a communication link can be established, the recording device may send metadata that has accumulated since the last transmission of metadata.

Steps 620-624 are not blocking steps. Execution of method 600 may loop back to receive 608 when a communication link cannot be established.

Figure 7:
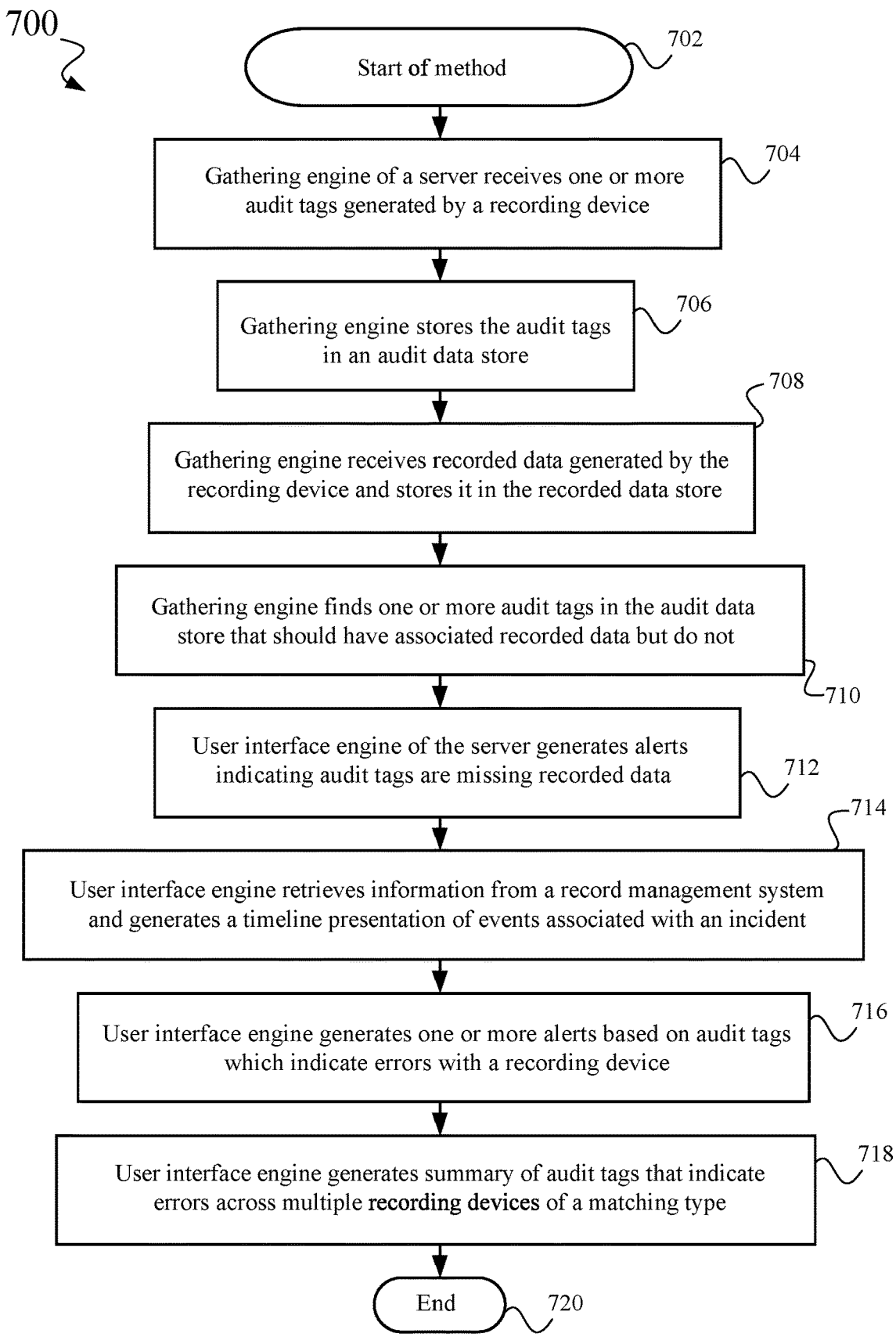
FIG. 7 is a method performed by a server for auditing recorded data.

Method 700, shown in FIG. 7, may be performed by a server for managing recorded data and metadata received from one or more recording devices.

Method 700 includes start 702, receive 704, store 706, file 708, match 710, missing 712, timeline 714, alert 716, summary 718, and end 720.

Execution of method 700 begins at start 702. Execution moves to receive 704.

In receive 704, a server (e.g., gathering engine 450) receives metadata from one or more recording devices 162/200. In this method, the metadata received include metadata that has been identified as audit tags and categorized as urgent. Execution moves to store 706.

In store 706, a server (e.g., gathering engine 450) stores the received metadata (e.g., audit tags categorized as urgent) in a data store (e.g., audit data store 442). Execution moves to file 708.

In file 708, a server (e.g., gathering engine 450) receives recorded data from a recording device. The server may also receive metadata including the same metadata received in receive 704. The server stores the recorded data and/or any metadata in a data store (e.g., recorded data store 440). File 708 may be executed at any time after receipt of the audit tags. In an implementation, audit tags are sent to the server when created or shortly thereafter and recorded data is sent to the server at the end of a shift or work day. A server may perform steps 704 and 706 when necessary and repeated without executing or being stopped in execution by the other steps in method 700.

In match 710, a server (e.g., gathering engine 450) matches audit tags stored in audit data store 442 to the recorded data from the same recording device that is stored in recorded data store 440. Match 710 searches for the recorded data associated with each audit tag received from the same recording device. Match 710 verifies (e.g., audits) that the recorded data associated with each audit tag has been provided to the server by the recording device.

If the server has received all recorded data associated with the audit tags generated by the recording device, then verification is complete and there are no issues to report. If all recorded data associated with audit tags may be accounted for, then method 700 is done for that set of audit tags and the recorded data from that recording device.

In match 710, the server finds audit tags for which no associated recorded data has been uploaded. Match 710 detects when important information has possibly been lost or tampered with. Execution moves to missing 712.

In missing 712, a server (e.g., user interface engine 452) generates alerts to inform an agency that recorded data may be missing. Missing 712 may provide the information stored in audit tag to provide additional information regarding the missing recorded data. A server may also optionally perform step timeline 714 to provide more information to help determine what data is missing.

In timeline 714, a server (e.g., user interface engine 452) retrieves (e.g., requests and receives) information from a record management system (e.g., record management system 410) or a dispatch system (e.g., dispatch system 110) that describes events that occurred before and after the missing recorded data. Timeline 714 may use the information from record management system 410, dispatch system 110, and the metadata associated with the recorded data to generate a timeline of events that occurred with respect to the recorded data. Operations performed by a recording device may be recorded with a time of performance of the operation. Information included in a timeline may include such operations as removal from a dock, coupling to a dock, a start time of recording, an end time of recording, geographic information received, messages received from other recording devices, metadata generated responsive to receiving a signal, metadata generated responsive to operation of the recording device, metadata generated responsive to captured data, identifying metadata as an audit tag, categorizing an audit tag as urgent or non-urgent, transmitting urgent audit tags, transmitting metadata, operations performed by a user as detected by a user interface (e.g., button presses), faults of a recording device, information received from a dispatch system, information received by a server, information received from an electronic device, information received from a vehicle detector, and establishment of communication links.

A timeline may be used to determine a content or a likely content of missing recorded data and/or metadata. Timeline 714 may be performed at any time and separate from the other steps of method 700. A timeline may be presented to a user using any conventional presentation program or method. Generating a timeline is not an event precedent to performing alert 716.

In alert 716, a server (e.g., user interface engine 452) generates one or more alerts to provide information regarding missing recorded data. An alert may be sent to a machine or person using any conventional protocol or in any conventional form (e.g., email, SMS message).

In summary 718, a server (e.g., user interface engine 452) generates a summary (e.g., list) of metadata that was identified as audit tags, the reason the metadata was identified as an audit tag, and the categorization (e.g., urgent, non-urgent) of the audit tag. A summary of audit tag information provides information as to the types of situations, occurrences, and/or events being encountered by personnel of the security agency. A summary may provide information regarding trends in event types or types of occurrences. A summary may provide information regarding the trends in urgent vs. non-urgent audit tags. Summary 718 may be performed independent of timeline 714 and alert 716. A server may provide a summary to an agency for review.

A summary may further include faults detected in equipment. A summary of faults may provide information for improving equipment and/or operation of equipment by users.

Method 700 terminates at end 720.

Many if not all of the steps may be performed in any order. Many steps of method 700 may be performed independent of other steps of method 700 as discussed above or indicated by FIG. 7. No step of method 700 will block (e.g., stop) execution of method 700 to stop execution of a step that may be performed independent of the other steps of method 700.

Figure 8:
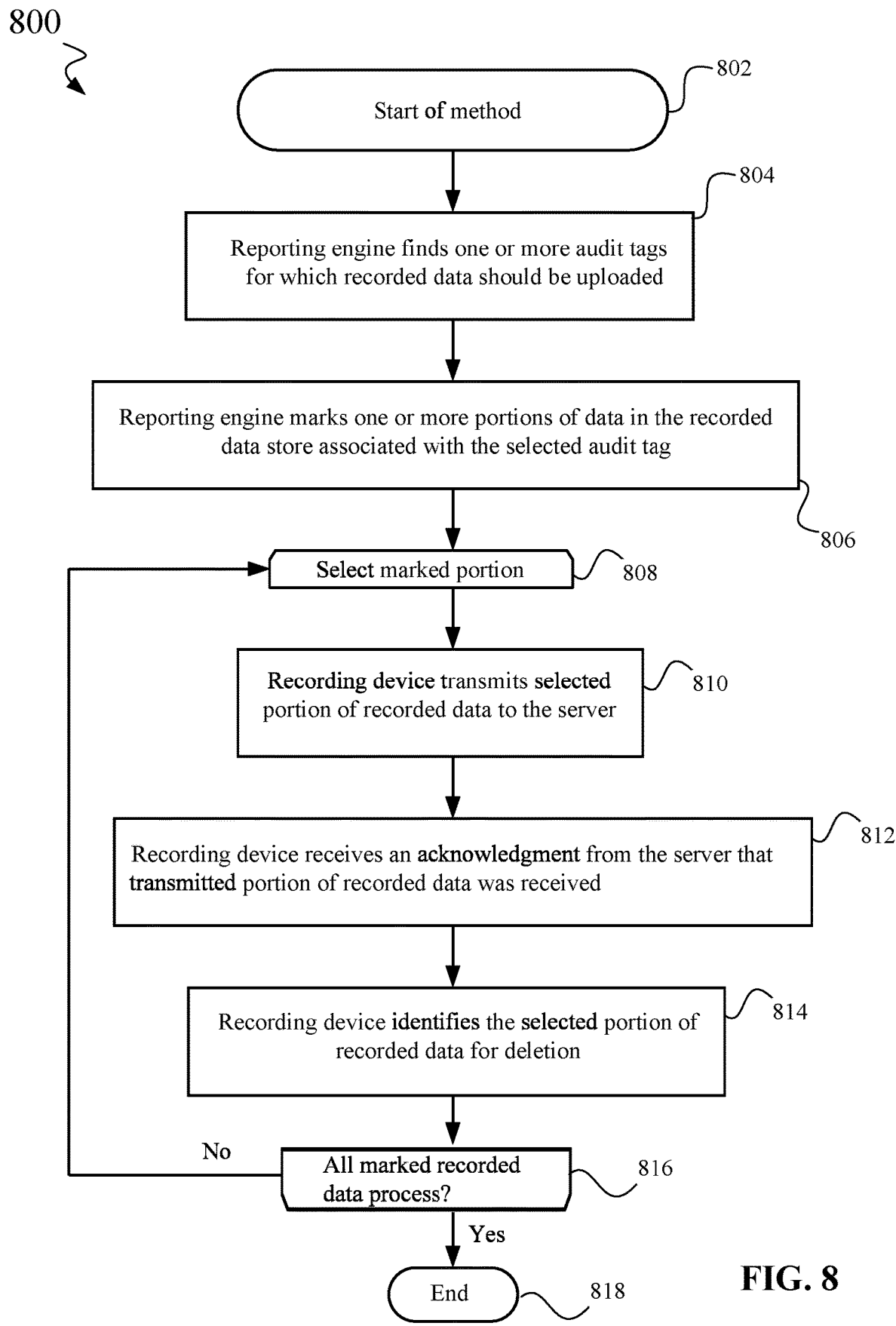
FIG. 8 is a method performed by a recording device for transmitting data.

Method 800, shown in FIG. 8, is a method performed by a recording device for providing recorded data associated with metadata to a server.

Method 800 may include blocks start 802, find 804, mark 806, select 808, transmit 810, receive 812, identify 814, done 816, and end 818.

Execution of method 800 begins at start of method 802. Execution moves to find 804.

In find 804, reporting engine 244 searches data stores (e.g., 440, 442, 444) of recording device 400 for metadata, including metadata that has been identified as audit tags, for metadata that includes or matches one or more criterion. A criterion may be provided by a server (e.g., evidence management server, dispatch server, agency server). Reporting engine 244 may search all metadata, metadata that has been identified as an audit tag, or metadata that has been identified as an audit tag and categorized as urgent. Execution moves to mark 806.

In mark 806, reporting engine 244 marks (e.g., identifies, highlights) one or more portions of recorded data in recorded data store 254 that is related to the metadata identified in step 804. The one or more criterion provided by a server may identify metadata that likely is associated with the start and/or end of an event or an occurrence of an event. Mark 806 may mark all recorded data between (e.g., in sequence of recording) metadata that match a criterion. In an implementation, reporting engine 244 may mark a portion of the recorded data that lies outside of the start time for the event and/or the end time for the event as indicated by one or more audit tags. For example, reporting engine 244 may identify metadata that are likely associated with recorded data at the start of an event and an end of an event. Reporting engine 244 may then mark recorded data that was recorded a first amount of time (e.g., 30 second, 60 seconds, so forth) prior to the recorded data associated with the start of an event and recorded data that was recorded a second amount of time (e.g., 30 second, 60 seconds, so forth) after the recorded data associated with the end of the event so that the data that is marked include the event plus some recorded data before and some recorded data after the event.

Marking one or more portions of recorded data may be accomplished using any suitable technique, including creating records identifying marked portions of recorded data in a data structure separate from the recorded data; creating records within metadata associated with the recorded data; setting a flag or other indicator in metadata associated with portions of the recorded data; and/or any other suitable technique.

Execution moves to select 808 to begin a loop wherein each marked portion of the recorded data is processed. The loop begins at select 808 and ends at next 816. In select 808, a marked portion of recorded data is selected. Execution moves to transmit 810.

In transmit 810, recording device 162/200 transmits the marked portion of recorded data to server 120. Transmission may be performed via dock interface 270, short-range wireless interface 262, and/or long-range wireless interface 260.

In an implementation, recording device 162/200 transmits the marked portions of recorded data and does not transmit the unmarked portions of the recorded data to reduce the resources used to prepare and transmit recorded data. In an implementation, all recorded data may be marked and recording device 162/200 transmits all of the recorded data. In another implementation, recording device 162/200 marks only a portion of recorded data and transmits the marked portions, but later transmits the remainder of the recorded data. In another implementation, recording device 162/200 marks only a portion of recorded data, transmits the marked portions and deletes all recorded data. Execution moves to receive 812.

In receive 812, recording device 162/200 receives an acknowledgement from server 120 that the selected data that was transmitted in step 810 was received by server 120. The acknowledgement may further indicate that the sever has stored the received recorded data in a data store. In an implementation, server 120 computes a hash or other value based on the received recorded data, and transmits the hash value to recording device 162/200 as part of the acknowledgement. Recording device 162/200 may compute the hash or other value based on its own copy of the recorded data to determine whether the recorded data was successfully received by server 120 without errors. The acknowledgement may be received by recording device 162/200 from server 120 via any suitable communication path. Execution moves to identify 814.

In identify 814, recording device 162/200 records an identifier (e.g., indicator) that the selected portion of recorded data is ready for deletion. In an implementation, recording device 162/200 may immediately delete the selected portion of recorded data. In another implementation, recording device 162/200 may store the identifier that the selected portion of recorded data is ready for deletion, and then later delete all of the recorded data that has been identified as ready for deletion. Execution moves to done 816.

In done 816, reporting engine 244 determines whether all of the marked recorded data has been transmitted to server 120. If all of the marked portions of recorded data have not been transmitted, execution moves to select 808. If all of the marked portions of recorded data have been transmitted, execution moves to end 818.

Figure 9:
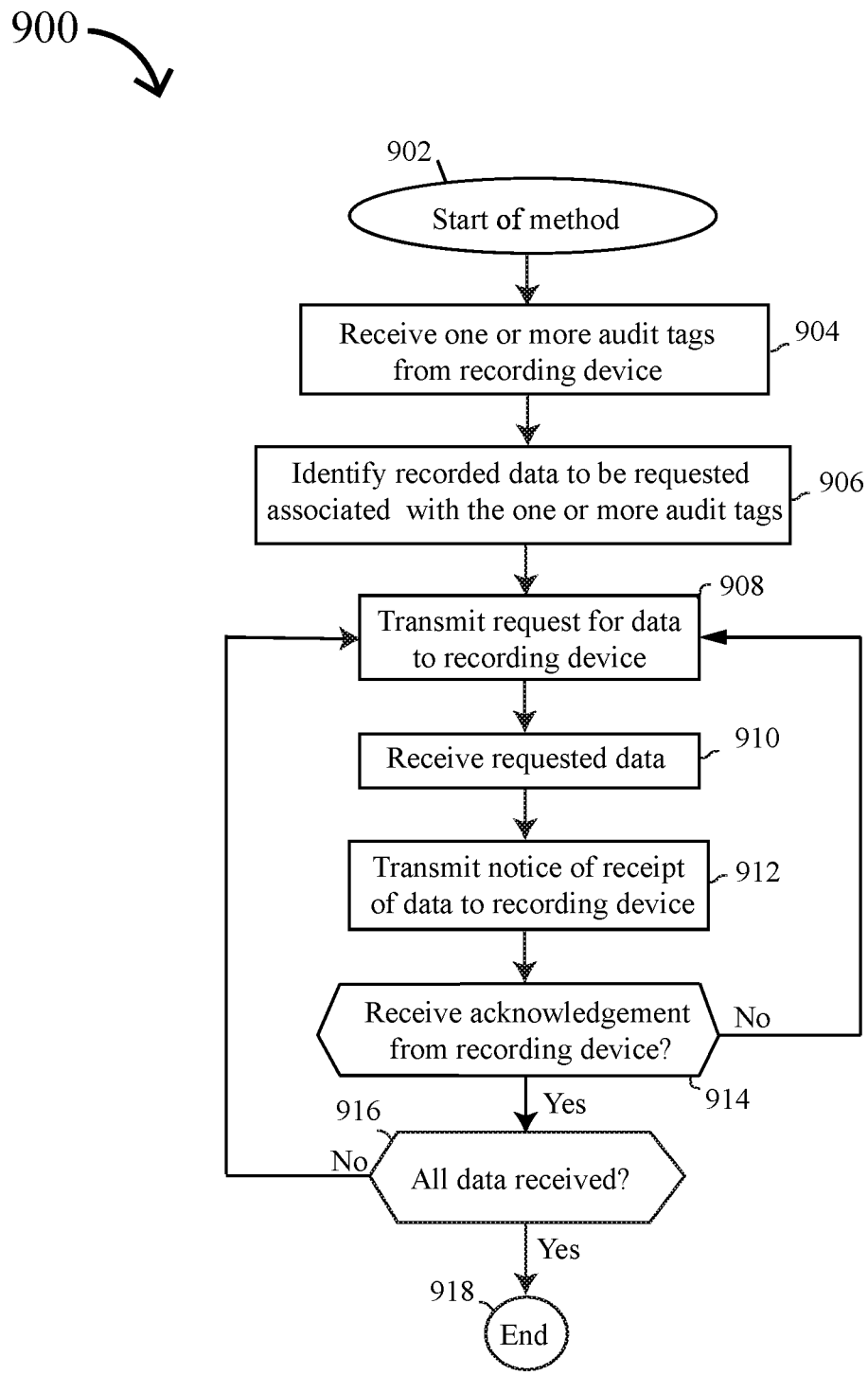
FIG. 9 is a method performed by a server for pulling data from a recording device.

Method 900, shown in FIG. 9, is a method performed by a server requesting (e.g., pulling) recorded data from one or more recording devices. A server may identify data on a recording device for request in accordance with metadata received by the server from the recording device prior to receipt of the data. A server may, as discussed above, receive metadata identified as audit tags and categorized as urgent prior to receiving recorded data from the recording device providing the audit tags. A server may use the audit tags to identify recorded data for the request.

Method 900 may include blocks start 902, receive 904, identify 906, request 908, receive 910, notice 912, acknowledge 914, check 916, and end 918.

A server, such as server 120/400, may perform the procedures of method 900 in whole or in combination with other computing devices or other electronic components. A server may communicate with recording devices and/or other computing devices via a network to perform method 900. A server may execute several instances of method 900 to communicate with and receive data from multiple recording devices at the same time.

Method 900 begins with start of method 902. Execution moves to receive 904.

In receive 904, server 120/400 receives metadata including audit tags or exclusively audit tags from recording device 162/200. The audit tags are associated with recording device 162/200, so server 120/400 may determine the identity of recording device 162/200. Execution moves to identify 906.

In identify 906, server 120/400 may use the information provided in the audit tags to determine the amount of recorded data to request from the recording device. Server 120/400 may request more or less recorded data than the recorded data associated with the audit tag. Server 120/400 may use the information provided by audit tags to determine one or more portions of recorded data stored by recording device 162/200 that server 120/400 may request from recording device 162/200. Execution moves to request 908.

In request 908, server 120/400 transmits (e.g., sends) a request to recording device 162/200. The request identifies recorded data stored in a data store of recording device 162/200 for transmission to server 120/400. Recording device 162/200 may acknowledge receipt of the request for data. Execution moves to receive 910.

In receive 910, server 120/400 receives the recorded data that server 120/400 requested from recording device 162/200. The recorded data received may include metadata associated with the recorded data. Server 120/400 may store the received data in a data store. Server 120/400 and recording device 162/200 may use cryptographic signatures to verify the authenticity of received data. Execution moves to notice 912.

In notice 912, server 120/400 transmits a notice to recording device 162/200 that server 120/400 received the requested recorded data. The notice may identify the recorded data received to distinguish what has been received from what has been requested, so that recording device 162/200 may transmit portions of recorded data in parallel or retransmit portions out of order and still be able to track which portions have been transmitted and received. Server 120/400 may also track recorded data from one or more recording devices so that server 120/400 may verify the request and receipt of all recorded data from multiple recording devices. Execution moves to acknowledge 914.

In acknowledge 914, server 120/200 determines whether it received acknowledgment from recording device 162/200 that recording device 162/200 received the notice of receipt transmitted in notice 912. During acknowledge 914, server 120 verifies that recording device 162 received the notice of receipt.

Once recording device 162/200 receives a notice of receipt of recorded data from server 120/400, recording device 162/200 may delete the recorded data that has been transmitted to server 120/400. In an implementation, recording device 162/200 deletes the recorded data that has been verified by server 120/400. In another implementation, recording device 162/200 does not delete the recorded data sent to server 120/400 but resends the data when all data is transferred from recording device 162/200 to server 120/400.

If server 120/400 does not receive acknowledgement in acknowledge 914, server 120/400 may assume that recording device 162/200 did not receive the notice of receipt and may request that the recording device 162/200 resend the recorded data. Recording device 162/200 may respond by resending the acknowledgement and/or the recorded data. Execution moves to check 916.

In check 916, server 120/400 determines whether it has received all of the data associated with the audit tags received in receive 904. If all the data associated with the audit tags has been received, server 120/400 moves to end 918 where method 900 terminates. If server 120/400 has not received all of the data associated with the audit tags, execution returns to request 908 to request additional data from recording device 162/200.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'comprises', 'including', 'includes', 'having', and 'has' introduce an open ended statement of component structures and/or functions. In the specification and claims, the words 'a' and 'an' are used as indefinite articles meaning 'one or more'. When a descriptive phrase includes a series of nouns and/or adjectives, each successive word is intended to modify the entire combination of words preceding it. For example, a black dog house is intended to mean a house for a black dog. While for the sake of clarity of description, several specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing". The invention includes any practical combination of the structures and methods disclosed. While for the sake of clarity of description several specifics embodiments of the invention have been described, the scope of the invention is intended to be measured by the claims as set forth below.

The location indicators "herein", "hereunder", "above", "below", or other word that refer to a location, whether specific or general, in the specification shall be construed to refer to any location in the specification where the location is before or after the location indicator.

What is claimed is:

1. A method for auditing an event, the method comprising:
capturing, by a processor of a body camera, recorded data of the event, the recorded data comprising audiovisual data;
wirelessly receiving, by the processor, a plurality of messages, each message indicating an occurrence in the event;
creating, by the processor, metadata for each message of the plurality of messages, each metadata describing information about the occurrence and a respective location of the occurrence in the recorded data;
identifying, by the processor, the metadata associated with at least one message from the plurality of messages as an audit tag;
assigning, by the processor, an urgent categorization to at least one metadata identified as the audit tag;
storing, by the processor, the recorded data and the metadata for each message of the plurality of messages in a data store of the body camera;
wirelessly transmitting, by the processor and via a first communication link using a first wireless interface, the metadata assigned the urgent categorization to a server;
in response to receiving the metadata assigned the urgent categorization, making a record, by the server, to confirm receipt at a later time of the recorded data associated with the metadata assigned the urgent categorization;
after wirelessly transmitting the metadata assigned the urgent categorization, transmitting, by the processor and via a second communication link using a second interface, the metadata for each message of the plurality of messages and the recorded data to the server;
in response to receiving the metadata for each message of the plurality of messages and the recorded data, confirming, by the server, receipt of the recorded data associated with the metadata assigned the urgent categorization based on the record; and
wherein wirelessly transmitting the metadata assigned the urgent categorization independent of and before transmitting the metadata for each message of the plurality of messages and the recorded data to the server permits the server to track the recording of an urgent event and to ensure the data integrity of the recorded data associated with the urgent event.

2. The method of claim 1 wherein receiving comprises receiving a signal that includes the one or more messages of the plurality of messages from at least one of a dispatch system, a conducted electrical weapon (CEW), a holster, a vehicle detector, a mobile data terminal (MDT), or an electronic device.

3. The method of claim 1 further comprising digitally signing, by the processor, the metadata for each message of the plurality of messages with a cryptographic hash.

4. The method of claim 3 further comprising digitally signing, by the processor, the recorded data.

5. The method of claim 1 wherein at least one of the identifying and assigning comprises determining a category of each metadata in accordance with an agency-specific guideline defining at least one of the urgent event and a non-urgent event.

6. The method of claim 1 further comprising receiving, by the processor, a request from the server to wirelessly transmit a portion of the recorded data based on the metadata.

7. The method of claim 6 further comprising wirelessly transmitting, by the processor, the portion of the recorded data to the server, and wherein wirelessly transmitting the portion of the recorded data reduces resources used to prepare and transmit the recorded data.

8. The method of claim 1 further comprising:
after transmitting the metadata for each message of the plurality of messages and the recorded data to the server:
receiving, by the processor, an acknowledgment receipt from the server; and
in response to receiving the acknowledgment receipt, deleting, by the processor, the metadata for each message of the plurality of messages and the recorded data from the data store of the body camera.

9. The method of claim 1 further comprising: after transmitting the metadata assigned the urgent categorization to the server, receiving, by the processor, an acknowledgment receipt from the server.

10. The method of claim 1 further comprising:
marking, by the processor, one or more portions of the recorded data that is related to the metadata assigned the urgent categorization; and wirelessly transmitting, by the processor, the one or more portions of the recorded data to the server, and wherein wirelessly transmitting the one or more portions of the recorded data reduces the resources used to prepare and transmit the recorded data.

11. The method of claim 1 further comprising:
detecting, by the processor, a disconnection of the body camera from a dock;
creating, by the processor, disconnection metadata documenting the disconnection of the body camera from the dock, wherein the disconnection metadata is unrelated to the recorded data;
identifying, by the processor, the disconnection metadata as a second audit tag; and
assigning, by the processor, a non-urgent categorization to the second audit tag, wherein the detecting, creating, identifying, and assigning are completed without capturing the recorded data.

12. The method of claim 1 further comprising:
allocating, by the processor, at least one of the recorded data and the metadata into a plurality of segments;
digitally signing, by the processor, each separate segment of the plurality of segments; and
wirelessly transmitting, by the processor, each segment of the plurality of segments separately to the server.

13. A system for auditing an event, the system comprising:
a server; and
a recording device comprising:
a processor;
a first wireless interface;
a second interface;
a sensor comprising a photo sensor and an audio sensor; and
a non-transitory computer-readable medium in communication with the processor, wherein the computer-readable medium includes a stored program, and wherein in response to the processor executing the stored program the processor:
captures, via the sensor, recorded data of the event, the recorded data comprising audiovisual data;
wirelessly receives a plurality of messages, each message indicating an occurrence in the event;
creates metadata for each message of the plurality of messages, each metadata describing information about the occurrence and a respective location of the occurrence in the recorded data;
identifies the metadata associated with at least one message from the plurality of messages as an audit tag;
assigns an urgent categorization to at least one metadata identified as the audit tag;
wirelessly transmits, via a first communication link using the first wireless interface, only the metadata assigned the urgent categorization to the server, wherein in response to receiving the metadata assigned the urgent categorization, the server makes a record to confirm receipt at a later time of the recorded data associated with the metadata assigned the urgent categorization; and
after wirelessly transmitting the metadata assigned the urgent categorization, transmits, via a second communication link using the second interface, the metadata for each message of the plurality of messages and the recorded data to the server, wherein in response to receiving the metadata for each message of the plurality of messages and the recorded data, the server confirms receipt of the recorded data associated with the metadata assigned the urgent categorization based on the record, wherein wirelessly transmitting the metadata assigned the urgent categorization independent of and before transmitting the metadata for each message of the plurality of messages and the recorded data to the server permits the server to track the recording of an urgent event and to ensure the data integrity of the recorded data associated with the urgent event.

14. The system of claim 13, the recording device further comprising a data store in communication with the processor, wherein the processor stores the recorded data and the metadata in the data store.

15. The system of claim 13 wherein the processor receives one or more messages of the plurality of messages from at least one of a conducted electrical weapon (CEW), a holster, a vehicle detector, a mobile data terminal (MDT), or an electronic device.

16. The system of claim 13 wherein the processor receives one or more messages of the plurality of messages from a dispatch system.

17. The system of claim 13 wherein the processor digitally signs the metadata with a cryptographic hash.

18. The system of claim 17 wherein the processor digitally signs the recorded data.

19. The system of claim 13 wherein the processor assigns the urgent categorization in accordance with an agency-specific guideline defining urgent occurrences and non-urgent occurrences.

20. The system of claim 13 wherein the processor receives a request from the server to wirelessly transmit the recorded data described in the metadata.

* * * * *